C. N. MERRITT.
SACK HOLDING DEVICE.
APPLICATION FILED FEB. 2, 1914.

1,111,850.

Patented Sept. 29, 1914.
2 SHEETS—SHEET 1.

Witnesses:

Inventor:
C. N. Merritt

C. N. MERRITT.
SACK HOLDING DEVICE.
APPLICATION FILED FEB. 2, 1914.

1,111,850.

Patented Sept. 29, 1914.
2 SHEETS—SHEET 2.

UNITED STATES PATENT OFFICE.

CLARENCE N. MERRITT, OF GLYNDON, MINNESOTA.

SACK-HOLDING DEVICE.

1,111,850.  Specification of Letters Patent.  Patented Sept. 29, 1914.

Application filed February 2, 1914. Serial No. 816,127.

*To all whom it may concern:*

Be it known that I, CLARENCE N. MERRITT, a citizen of the United States, residing at Glyndon, in the county of Clay and State of Minnesota, have invented a new and useful Sack-Holding Device, of which the following is a specification.

My invention relates to an improvement in sack holders and has for its main object horizontally adjustable bars operating on stationary brackets of which the following is full description of same. I attain this object by the mechanism illustrated in the accompanying drawings of which:—

Figure 1:
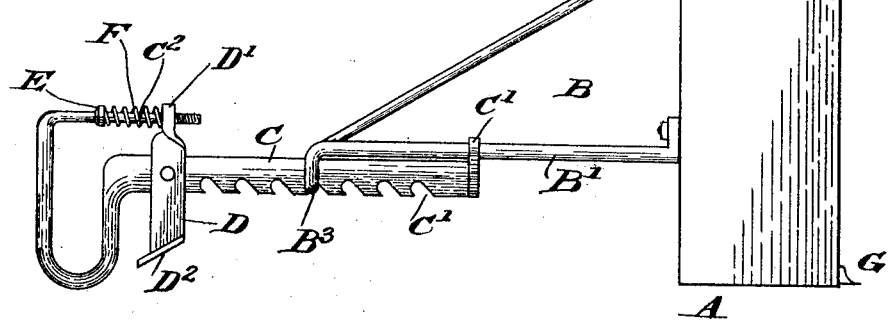
Figure 2:
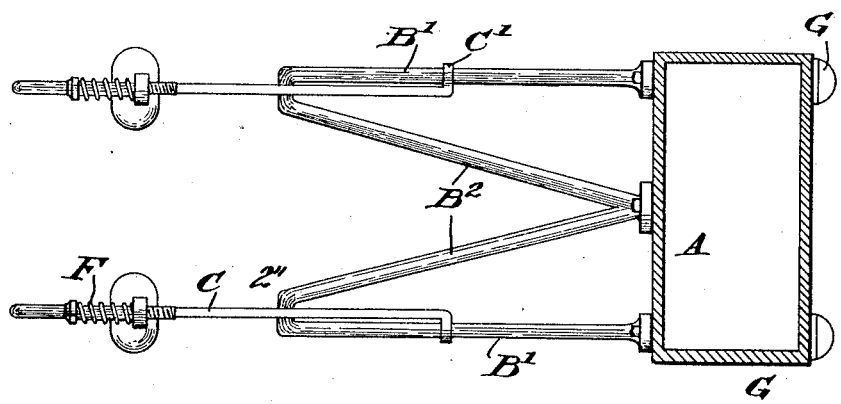
Figure 3:
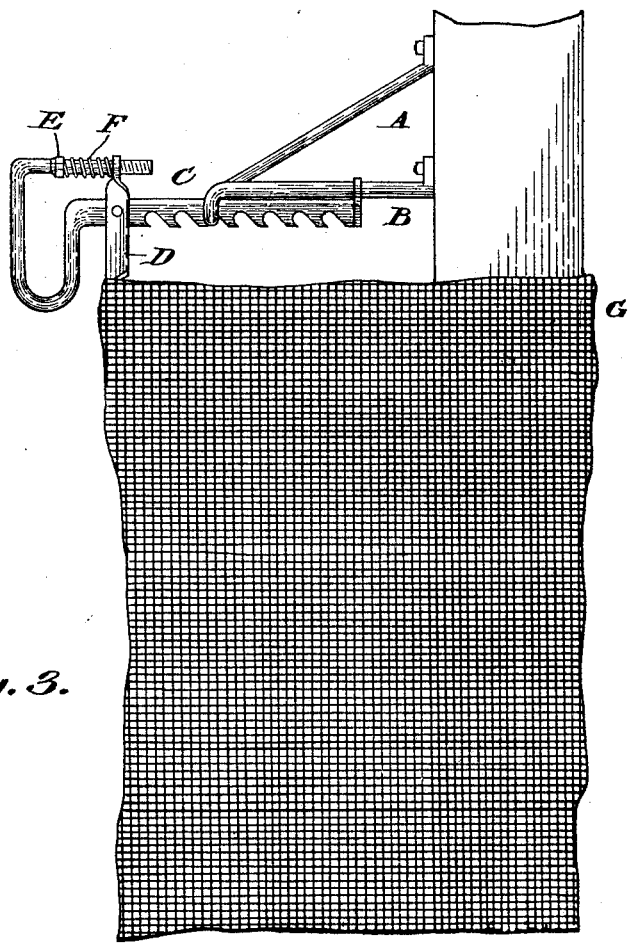

Figure 1 is a side view of the device; Fig. 2 a plan view of same. Fig. 3 is a side view showing the grain sack attached.

Referring to the accompanying drawings, which form a part hereof and in which like characters denote similar parts, A designates a chute or spout to which the device is attached. A bracket B is secured to one side of said spout, said bracket consisting of the side members B' and a connecting V-shaped part B² each of which members and part having, as shown, means for securing it to the spout. Adjustably held on each side member of the said bracket is an arm C having a looped end C' adapted to slide on a side member, and a notched under face C' in one of the notches of which a depressed portion B³ of the bracket engages so as to hold said arm in its adjusted position.

Pivotally attached to each of the arms B is a bag holding hook or member D, having at its upper end an eye or loop D' and at its lower end a hook or extension D² to engage the bag. The front portion of each of the arms C is formed curved as shown to provide a bar C² parallel with the main portion of the arm and having a threaded end passing through the loop D'. A collar or nut E movable on the threaded portion of the said bar provides for the adjustment of the tension of the spring F, which holds the hook D² in engagement with the bag. On the opposite side of the spout from the bracket B are secured two brackets or bag engaging members G, G. In the use of the device the arms C are adjusted in regard to the size of the bag to be held which is then secured to the brackets G, G, and to the hooks D².

The foregoing is such a clear concise and exact description of the device as to enable any person skilled in the art to make and use the same.

Slight changes and modifications may be made within the scope of the appended claims without departing from the spirit of the invention, and I do not desire to be limited to the exact construction shown and described.

What I claim is:

1. A bag holding device consisting of a bracket having side members, arms adjustable on said side members and having bag engaging hooks pivoted thereon, and other bag engaging means; said bracket and said other bag engaging means being adapted to be secured on opposite sides of a spout and said arms having means for adjusting the movement of said pivoted hooks.

2. A bag holding device consisting of a bracket having depressed portions and side members, arms slidable on said side members and having notches in which said depressed portions are engaged, bag engaging hooks pivoted on said arms, adjustable means connected with said arms for regulating the movement of said pivoted hooks, and other bag engaging means for holding the opposite side of a bag from that held by said pivoted hooks.

3. In a bag holding device, the combination of a bracket, arms adjustable thereon, pivoted bag engaging hooks on said arms, and adjustable means carried by an upper portion of said arms and engaging said hooks for controlling the movement thereof.

C. N. MERRITT.

Witnesses:
 O. C. HEYS,
 A. J. FITZSIMMONS.

---

Copies of this patent may be obtained for five cents each, by addressing the "Commissioner of Patents, Washington, D. C."